United States Patent [19]

Dea et al.

[11] Patent Number: 5,408,177

[45] Date of Patent: Apr. 18, 1995

[54] METER MOUNTING PLATE MEMBER IN A BATTERY CHARGER CASING

[76] Inventors: William S. Dea, 10720 Louisiana Cir., Bloomington, Minn. 55438; Curt A. Deiner, 12842 Nicollet Ave. S., Burnsville, Minn. 55337

[21] Appl. No.: 125,872

[22] Filed: Sep. 27, 1993

[51] Int. Cl.⁶ .......................... G01R 1/04; G01R 1/02
[52] U.S. Cl. ..................................... 324/156; 324/114; 324/115; 320/2
[58] Field of Search ............... 324/114, 115, 143, 156, 324/157, 426, 427; 320/2, 48; 361/364, 365, 369–371; D10/26, 75, 77, 123, 124

[56] References Cited

U.S. PATENT DOCUMENTS

| | | | |
|---|---|---|---|
| 840,569 | 1/1907 | Lea | 324/114 |
| 1,036,951 | 8/1912 | Apple | 320/48 X |
| 2,246,163 | 1/1939 | Cheeseman | 324/114 X |
| 2,384,350 | 9/1945 | Skulley | 324/114 |
| 2,507,803 | 5/1950 | Miller | 324/114 |
| 3,663,939 | 5/1972 | Olsson | 320/48 |
| 3,969,667 | 7/1976 | McWilliams | 324/427 |
| 4,449,089 | 5/1984 | Winkler | 320/15 |
| 4,819,129 | 4/1989 | Erickson | 324/156 X |
| 4,843,299 | 6/1989 | Hutchings | 320/31 |
| 5,063,341 | 11/1991 | Gali | 320/2 X |

OTHER PUBLICATIONS

K-Mart Sale Paper For Auto, Sep.; 1994, pp. 1, 6, 8.

*Primary Examiner*—Kenneth A. Wieder
*Assistant Examiner*—Jay M. Patidar

[57] ABSTRACT

A dual meter mounting plate member carrying an ammeter and a voltmeter, the plate member having therein recesses to receive the voltmeter and the ammeter, the plate member being removably attached to within a battery charging casing, the ammeter being connected to the charging circuit and the voltmeter having terminals across the battery to be charged to indicate the state of charge.

4 Claims, 1 Drawing Sheet

METER MOUNTING PLATE MEMBER IN A BATTERY CHARGER CASING

BACKGROUND OF THE INVENTION

1. Field of Invention

This invention relates to an electric meter mounting plate in connection with a battery charger.

2. Description of the Prior Art

A meter for a battery charger consisting of a voltmeter and an ammeter may be variously positioned in connection with a battery charger.

The meter is customarily mounted onto the casing or housing of a battery charger as an integral part thereof and in this relationship becomes a permanent part of the charging circuitry.

SUMMARY OF THE INVENTION

It is an object of this invention to provide for the removable attachment of a metering device to the housing or casing of a battery charger for operation on therewith.

It is another object herein to provide a mounting plate for attachment to the housing of a battery charger, the mounting plate embodying an ammeter and a voltmeter, the ammeter having contacts for connection with the charging circuit of the battery charger to provide a reading of the charging current and a voltmeter having terminals connected across the battery to be charged to indicate the state of charge of the battery.

It is a further object herein to provide for the removable attachment of a meter mounting plate with the housing or casing of a battery charger.

It is also an object herein to provide a mounting plate member particularly configured to be positioned and mounted within a battery charger housing, the same having a wall opening or window through which the meters on the mounting plate may be conveniently read.

Further said mounting plate provides for the positioning of the ammeter and voltmeter therein and for the removable positioning of the voltmeter thereon.

Also integral with said mounting plate is an angled bracket portion thereof for the removable mounting of said plate within a battery charger housing.

These and other objects and advantages of the mounting plate herein will be set forth in the following description made in connection with the accompanying drawings in which like reference characters refer to similar parts throughout the several views.

DESCRIPTION OF A PREFERRED EMBODIMENT

Figure 1:
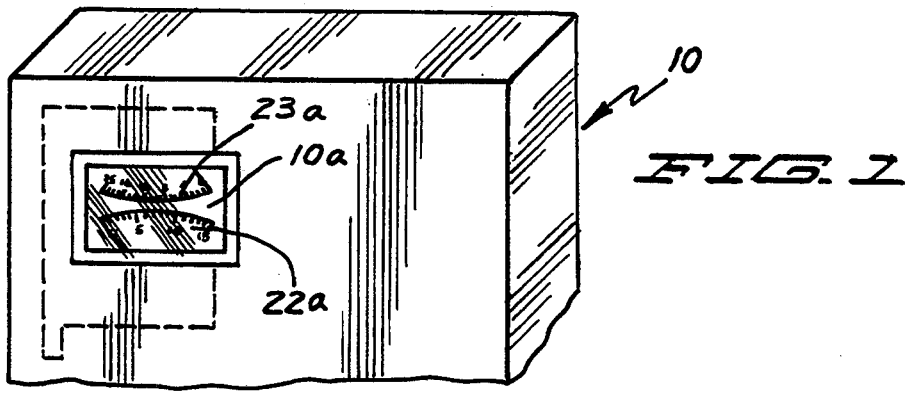
FIG. 1 is a view in perspective of a battery charging housing showing the dials of the invention herein.

Referring to FIG. 1, a battery charger housing 10 is shown in perspective having a window 10a therein for a meter reading therethrough of the meter scales 22a and 23a.

Figure 2:
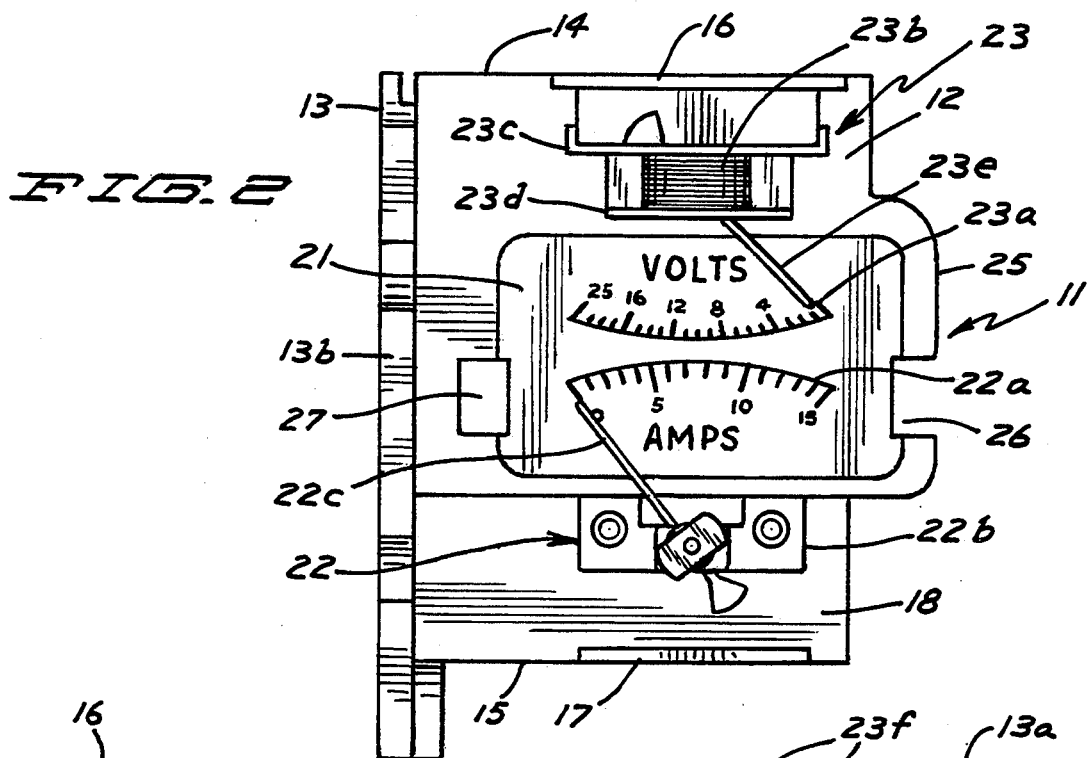
FIG. 2 is a view in front elevation of the meter of the invention herein.
Figure 4:
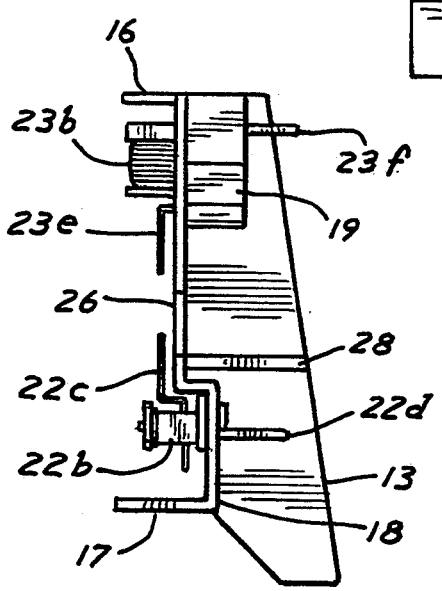
FIG. 4 is a view of FIG. 3 in side elevation.
Figure 3:
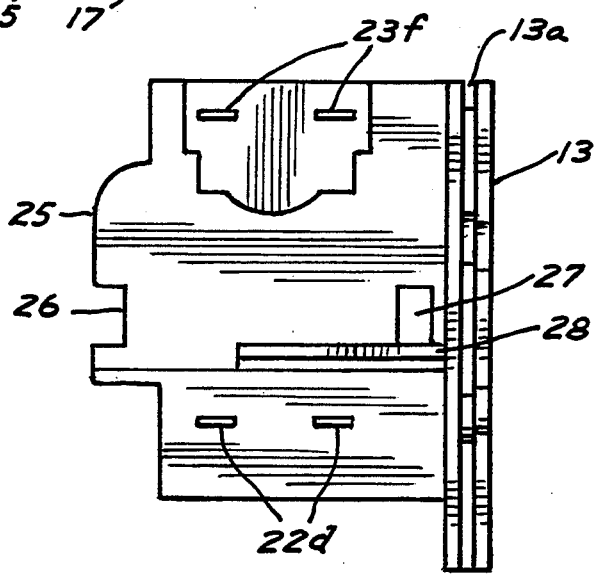
FIG. 3 is a view of FIG. 2 in rear elevation.

Shown in FIG. 2 is a metering device 11 comprising a mounting plate 12 bearing said meters 22 and 23. Said mounting plate is particularly configured to be removably positioned within said housing 10, the interior of said housing not here being shown.

Said plate member 12 is shown as being substantially rectangular in plan having at one side thereof a rearwardly angled wall 13 having a slot 13a formed therein the length or height thereof into which is received for mounting purposes a corresponding wall projection of said housing not here shown.

The leading or forward edge 13b of said wall is contoured to fit nicely into said housing.

Said mounting plate has upper and lower edge portions 14 and 15. Extending forwardly of said edge portions are upper and lower ledges 16 and 17.

Spaced upwardly from said lower edge portion 15, said mounting plate, as shown, has a rearwardly recessed plate portion 18.

Adjacent the upper edge portion 14 of said mounting plate is a rectangular recess forming a rearwardly projecting housing 19.

Overlying said mounting plate between said recessed portion 18 and said upper recess 19 is a meter dial plate 21 showing an upper voltmeter scale 23a and a lower ammeter scale 22a, said scales being shown in the present embodiment in comparative relationship and bearing conventional indicia which for purpose of illustration is shown as 0 to 25 volts and as 0 to 15 amperes respectively.

Mounted onto said recessed portion 18 of said mounting plate member is an ammeter 22 comprising a bracket 22b. Adapted to be pivotally mounted thereon is a needle or pointer 22c for reading said ammeter scale and projecting rearwardly through said mounting plate is a pair of electrical contacts 22d.

Removably positioned into said recessed housing 19 of said mounting plate and extending forwardly outwardly thereof is a voltmeter 23 having a winding 23b between opposing upper and lower walls 23c and 23d of said housing and extending through said lower wall thereof to provide for a reading on said voltmeter scale is a pivotally mounted needle or pointer 23e.

Extending through the rear wall of said recessed housing 19 of said mounting plate are a pair of voltmeter electrical contacts 23f.

Said mounting plate has its side edge portion 25 contoured outwardly as shown for placement within said housing 10, the same having a notch 26 therein and oppositely laterally thereof is an opening or window 27.

When positioned within said battery charger housing, the ammeter contacts 22d will be connected to be in circuit with the current charging circuit axed the voltmeter contacts 23f will be connected across the battery being charged to indicate the state of the charge in the battery being charged. The ammeter provides a reading of the charging current.

On the rear wall of said mounting plate extending inwardly from said side wall 13 is an angled reinforcement plate 28.

Thus there is provided a very well defined mounting plate comprising a metering device having both ammeter and voltmeter scales to be used in connection with battery chargers having appropriate housings to have said metering device positioned therein.

It will of course be understood that various changes may be made in the form, details, arrangement and proportions of the device of the invention without departing from the scope of the invention, which, generally stated, consists in an apparatus capable of carrying out the objects above set forth, such as disclosed and defined in the appended claims.

What is claimed is:

1. A meter mounting plate member, comprising
a plate member,
means releasably positioning said plate members within a battery charger housing,
a dial overlying substantially a central portion of said plate member,
a voltmeter and an ammeter scale present on said dial,
a lower portion of said plate member being recessed,
an ammeter secured to said recessed portion including a pivotal needle extending to said ammeter scale and a pair of electrical contacts,
an upper portion of said plate member being particularly adapted to receive a voltmeter releasably secured thereto, and
said voltmeter has a pivotal needle extending to said voltmeter scale and having an integral pair of electrical contacts.

2. The structure of claim 1, wherein
said ammeter contacts are adapted to be connected in circuit with the charging current of a battery charger to indicate the state of the charging current, and
said voltmeter contacts are adapted to be connected across a battery being charged to indicate the charge condition of the battery being charged.

3. A meter mounting plate member, comprising
a plate member, means releasably positioning said plate member within a battery charger housing,
a side edge portion of said plate member extending rearwardly and having an inward extending slot the full length thereof,
an upper and lower edge portion of said plate member each having a forwardly projecting ledge,
a portion of said plate member above and adjacent to said lower edge being recessed to extend rearwardly,
a dial overlying a portion of said plate member above said recessed portion,
said dial having thereon both a voltmeter and an ammeter scale,
an ammeter secured to said recessed portion and having a pivotal needle extending to said ammeter scale and having an integral pair of electrical contacts extending rearwardly through said plate member,
a rearwardly projected housing beneath said upper edge ledge,
a voltmeter removably positioned into said housing,
a pair of electrical contacts integral with said voltmeter extending rearwardly of said housing, and
said voltmeter having a pivotal needle extending to said voltmeter scale.

4. A meter mounting plate member, comprising
a plate member,
means releasably positioning said plate member within a battery charger housing,
an upper and lower edge portions of said plate member each having a forwardly projecting ledge,
said plate member having a recessed portion above said ledge of said lower edge portion,
a dial overlying a portion of said plate member above said recessed portion,
said dial having a voltmeter scale and an opposed ammeter scale,
an ammeter secured in said recessed portion having a pivotal needle extending to said ammeter scale and having an integral pair of electrical contacts,
a removably secured voltmeter under said ledge of said upper edge portion,
said voltmeter embodying a pivotal needle extending to said voltmeter scale and having a pair of integral electrical contacts extending rearwardly of said plate member, and
wherein said ammeter is adapted to be connected in circuit with the charging current of a battery charger and said voltmeter is adapted to be connected across a battery being charged to indicate the state of charge of a battery being charged.

* * * * *